Aug. 17, 1965  T. B. DALTON  3,201,087
LANDING GEAR STRUCTURE FOR SEMI-TRAILERS AND THE LIKE
Original Filed May 17, 1962  5 Sheets-Sheet 1

INVENTOR.
THOMAS B. DALTON
BY
Barnes, Kisselle, Raisch & Choate
ATTORNEYS

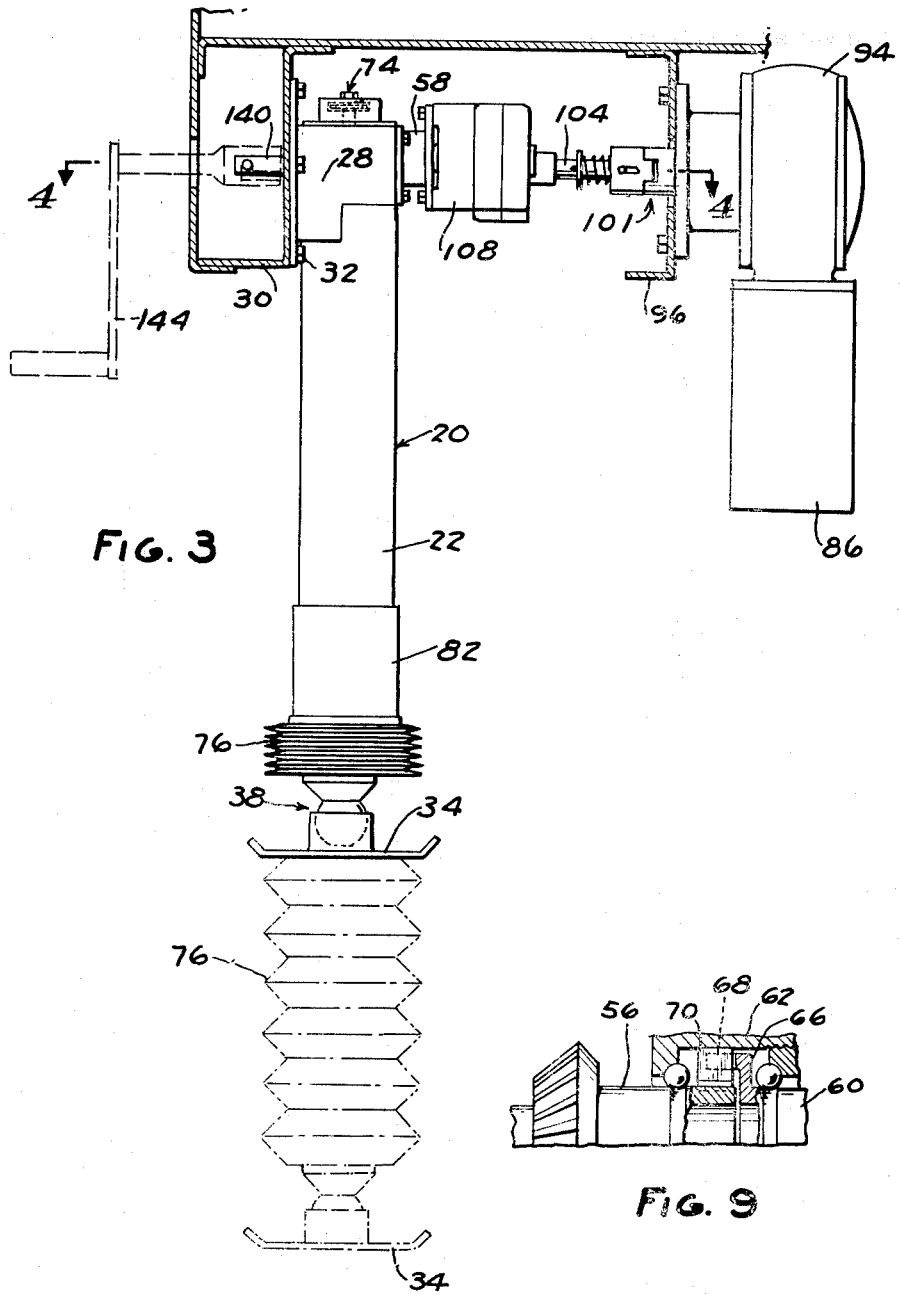

Aug. 17, 1965 T. B. DALTON 3,201,087
LANDING GEAR STRUCTURE FOR SEMI-TRAILERS AND THE LIKE
Original Filed May 17, 1962 5 Sheets-Sheet 3
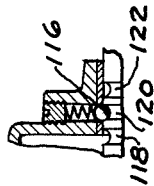
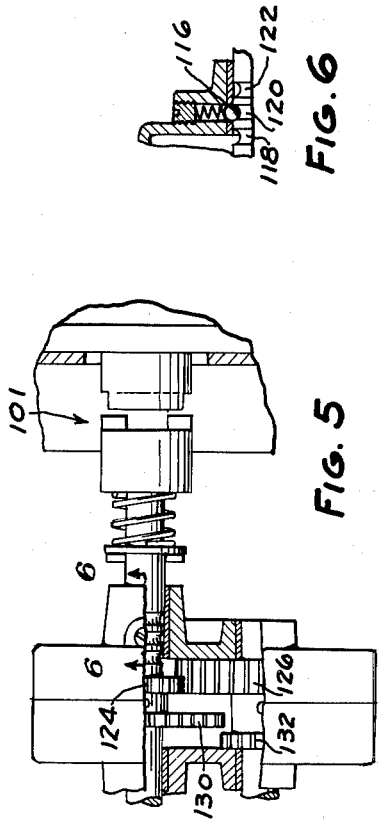
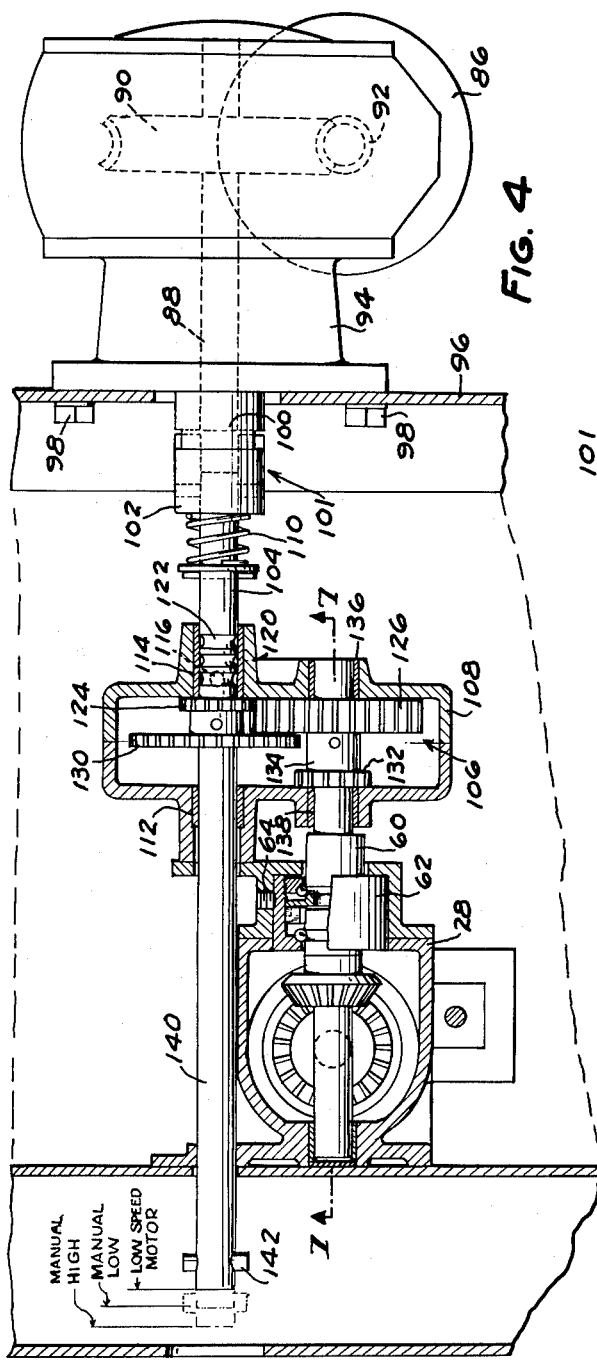
INVENTOR.
THOMAS B. DALTON
BY
Barnes, Kisselle, Raisch & Choate
ATTORNEYS Aug. 17, 1965 T. B. DALTON 3,201,087
LANDING GEAR STRUCTURE FOR SEMI-TRAILERS AND THE LIKE
Original Filed May 17, 1962 5 Sheets-Sheet 4

INVENTOR.
THOMAS B. DALTON
BY
Barnes, Kisselle, Raisch & Choate
ATTORNEYS

United States Patent Office 3,201,087
Patented Aug. 17, 1965

3,201,087
LANDING GEAR STRUCTURE FOR SEMI-TRAILERS AND THE LIKE
Thomas B. Dalton, Muskegon, Mich., assignor to Westran Corporation, Muskegon, Mich., a corporation of Michigan
Original application May 17, 1962, Ser. No. 195,778. Divided and this application Nov. 9, 1964, Ser. No. 409,871
9 Claims. (Cl. 254—86)

This application is a division of my copending application Serial No. 195,778 filed May 17, 1962, and entitled Landing Gear Structure for Semi-Trailers and the Like. This invention relates to a landing gear of the general type used to support the forward end of a semi-trailer when it is uncoupled from its tractor or other supporting structure. More particularly, the invention involves motor-powered landing gear legs which are adapted not only for supporting the forward end of a semi-trailer but also for supporting and levelling an entire vehicle in the field. Examples of the vehicles contemplated are trailers or vans carrying scientific instruments or radar equipment which must be levelled to operate properly.

The object of the invention is to provide a relatively simple, inexpensive, motor-powered leg structure which is improved to function quickly, easily, and in a foolproof manner, both when retracted during highway use and when extended for supporting and levelling the vehicle.

The invention generally contemplates a vertically telescoping leg structure which is extended and shortened by a recirculating ball nut and jackscrew in turn operated through a two-directional overrunning clutch which prevents the jackscrew from turning under any conditions except when the driving member of the clutch is rotated. A motor is provided for rotating the driving member of the clutch, and the power transmission means between the motor and clutch includes a second clutch and a shaft which is axially shiftable for engaging and disengaging the second clutch.

The second clutch is disengaged when this shaft is positioned for manual operation of the landing gear and is engaged when the shaft is shifted to another position to facilitate motor operation of the landing gear. The motor drives the mechanism through a worm gear so that the axially shiftable shaft cannot be manually turned while the second clutch is engaged. The various advantages of this structure appear in the detailed description.

In one form of the invention, the motor unit is mounted so that it can rock slightly under the reaction to its output torque when the leg which it is extending begins to assume the weight of the vehicle. Rocking of the motor actuates circuitry which informs an operator that the leg is ready to raise its portion of the vehicle. This information facilitates levelling and otherwise vertically adjusting the vehicle. One form of the invention is shown in the accompanying drawings.

FIG. 3 is an enlarged generally sectional view on line 3—3 of FIG. 1.

FIG. 4 is an enlarged generally sectional view on line 4—4 of FIG. 3.

FIG. 5 is a fragmentary view of the mechanism shown in FIG. 4 with certain of the parts being shown in a different position.

FIG. 6 is a fragmentary slightly enlarged generally sectional view on line 6—6 of FIG. 5.

FIG. 9 is an enlarged diagrammatic partly sectional view illustrating a clutch structure in the landing gear operating mechanism.

Figure 1:
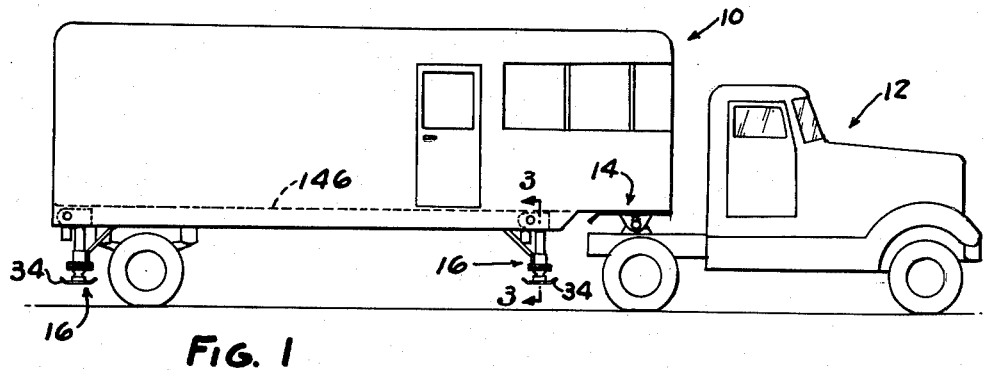
FIG. 1 is a partly diagrammatic side elevation of a tractor coupled to a semi-trailer utilizing landing gear according to this invention.
Figure 2:
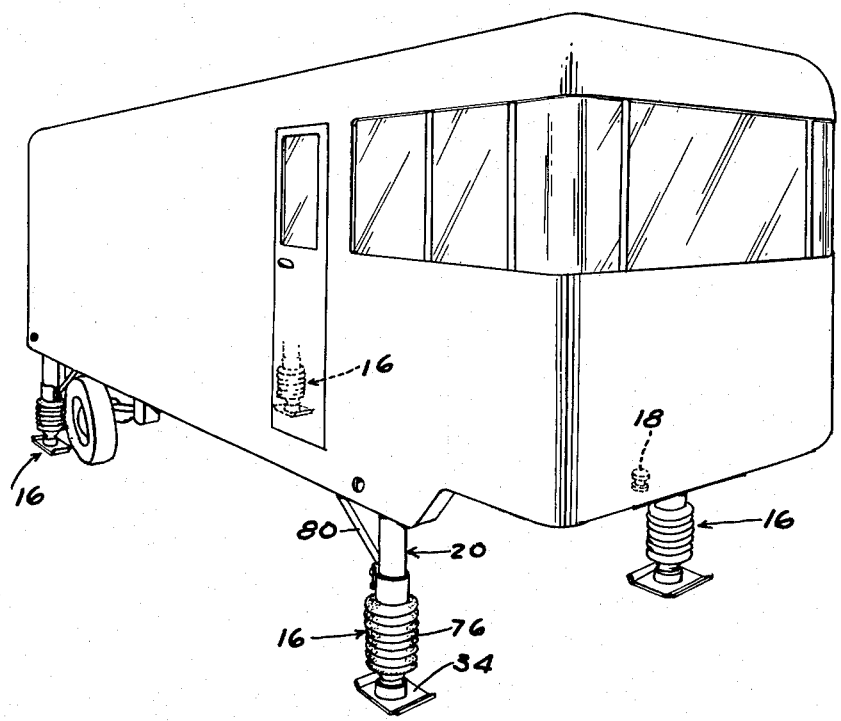
FIG. 2 is a partly diagrammatic perspective view of the semi-trailer uncoupled from the tractor with the landing gear legs in trailer-levelling condition.

Shown in the drawings is a semi-trailer 10 coupled to a tractor 12 through a conventional fifth wheel 14. The semi-trailer is equipped with landing gear structure 16 according to this invention adjacent its two rear corners and adjacent the front corners to the rear of fifth wheel 14. The trailer has a depending king-pin 18 adjacent its forward end which forms a part of the fifth wheel connection.

Figure 8:
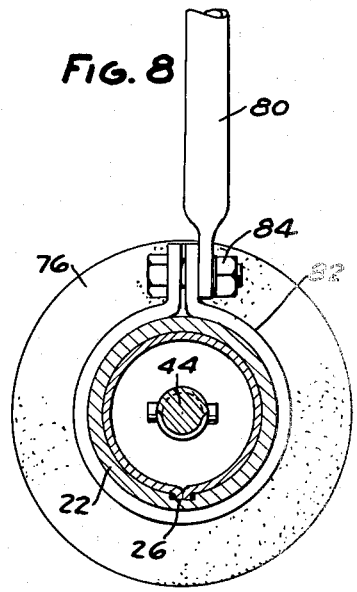
FIG. 8 is generally a sectional view on line 8—8 of FIG. 7.

The four landing gears 16 have identical construction. Each landing gear has a leg 20 with an outer upper tubular section 22 and an inner lower telescoping section 24. The two leg sections are keyed against relative rotation by a spline and groove arrangement 26 (FIG. 8). Upper leg section 22 has a head portion 28 which is anchored on trailer frame 30 as by bolting 32. Inner leg tube 24 has a ground-engaging foot 34 secured to its lower end portion 36 through a ball and socket joint 38 facilitating universal rocking of the foot relative to the leg.

Leg tube 24 is telescoped vertically relative to leg tube 22 for extending and shortening the landing gear leg by means of an anti-friction operating device, and for this purpose, inner leg tube 24 is provided within its upper end portion 40 with a non-rotatable, recirculating ball type nut 42 engaged with a jackscrew 44 extending within tube 24 and being rotatably supported on head 28 through thrust bearings 46.

Jackscrew 44 is provided with a bevel gear 48 at its upper end, and this gear meshes with a bevel gear 50 on a shaft 52 journaled on head 28 at 54. Shaft 52 is operably connected to the driven member or shaft 56 of a two-directional overrunning clutch 58 which has a driving member or shaft 60. Clutch 58 is constructed and arranged so that when shaft 60 is turned in either direction, shaft 56 will turn therewith to operate jackscrew 44. However, clutch 58 prevents any rotation beyond two or three degrees by shaft 56 in either direction independently of shaft 60.

Clutch 58 is of a conventional type having an outer housing 62 which is anchored in a stationary manner on landing gear head 28 as by set screw means 64 (FIG. 4). Shaft 60 carries a number of radially extending, circumferentially spaced control elements 66 (FIG. 9) having axially extending end portions 68, each of which projects between a pair of sprags or cams 70. Regardless of which way shaft 60 is turned, the sprags are released so that shaft 56 can be turned; and no matter which way shaft 56 tries to turn independently, one of the cams engaging a control element 68 will be wedged against the interior of housing 62 to prevent rotation.

Gear 50 meshes with another bevel gear 72 in head 28, and this gear operates a revolution counter 74 or similar device for limiting upward movement of leg tube 24. A bellows 76 is connected between the outer and inner leg tubes to exclude dirt from the operating mechanism within the leg tube. A strut 80 is fastened to each leg 20 by means of a collar 82 bolted around outer tube 20 as at 84 (FIG. 8), and each strut 80 is anchored by suitable means to a frame member or the like (not shown) of trailer 10.

A motor 86 is provided for power operation of leg 20.

Motor 86 can be driven by any power source such as electricity, compressed air, or hydraulic fluid according to the equipment available on the particular vehicle involved. Motor 86 drives a driven shaft 88 through a unidirectional power transmitting mechanism such as a worm wheel 90 on the drive shaft engaged by a worm gear 92 on the motor shaft. Motor 86 and the reduction gearing mechanism 90, 92 are shown as having unitary construction with their housing 94 which is secured to a frame member 96 of trailer 10 by bolting as at 98.

Drive shaft 88 carries one element 100 of a tooth-type clutch whose other element 102 is carried by a shaft 104 which provides the power input for gearing 106 in a gearbox 108 through which overunning clutch shaft 60 is driven. Clutch element 102 is slidably mounted in a conventional manner on shaft 104 and is yieldably biased toward clutch element 100 by coil spring 110. Shaft 104 is both axially slidable and rotatable in its gearbox journals 112, 114 and is yieldably held in three axial positions by a spring-pressed detent ball 116 engageable selectively in axially spaced grooves 118, 120, 122 in shaft 104.

In one axial position of shaft 104 (FIG. 4) clutch 101 is engaged and a small gear 124 is engaged with a larger driven gear 126 in the gearbox. In an intermediate position of shaft 104 (FIG. 5) clutch 101 is disengaged, but gears 124 and 126 remain in engagement. In a third position of shaft 104 (not illustrated) gear 124 is disengaged from gear 126, but a larger gear 130 on shaft 104 has moved leftward as FIG. 4 is viewed into engagement with a relatively small gear 132 on shaft 134 which carries gear 126. Shaft 134 is journaled in the gearbox at 136 and 138 and is operably coupled with overrunning clutch shaft 60.

Gearbox 108, as well as clutch 58, is mounted on head 28 of the landing gear leg so that these components are in the form of a unitary subassembly. Shaft 104 may also be considered a part of this subassembly. Shaft 104 has an extension 140 which is provided with lugs 142 adjacent its end for detachable connection with a manually operable crank 144.

Motors 86 are controlled by suitable circuitry and mechanism which senses the orientation of trailer floor 146 with respect to the horizontal. This mechanism and circuitry actuate motors 86 as necessary to lengthen and shorten legs 20 to bring floor 146 to level condition. The mechanism and circuitry for operating the motors is not a part of this invention.

Figure 7:
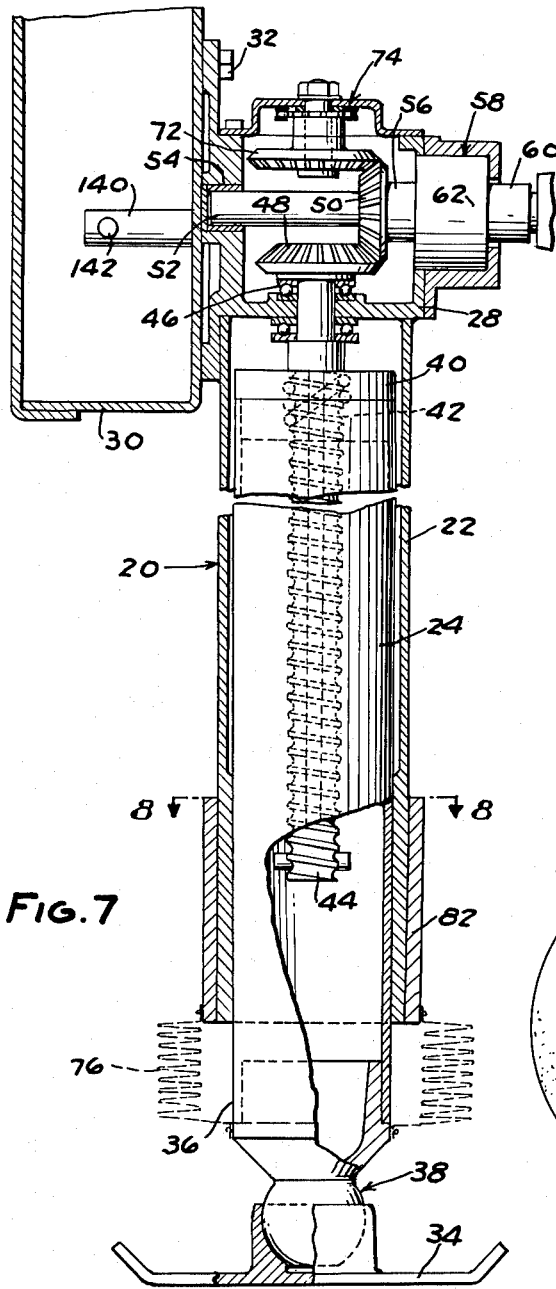
FIG. 7 is a generally sectional view on line 7—7 of FIG. 4.

In use, it may be assumed that the landing gears 16 have been mounted on trailer 10 in the manner described and that trailer 10 is initially coupled to tractor 12. Legs 20 are in shortened or retracted condition so that foot plates 34 are above the ground as illustrated in FIG. 1. The internal parts of legs 20 are in the positions shown in FIG. 7. Legs 20 are in condition for highway use of trailer 10. The position of shaft 104 at this time is inmaterial.

The recirculating ball nut and jackscrew arrangement 42, 44 is provided to facilitate rapid, easy extension and retraction of leg 20. However, the ball nut and screw is so efficient that leg tube 24 of its own weight would cause the jackscrew to turn under the bumps and vibrations incidental to road use and leg tube 24 would drop downwardly if jackscrew 44 were not restrained against rotation. As is pointed out above, clutch 58 prevents this from happening by restraining shaft 56 against rotation independently of shaft 60 of the clutch. Consequently, the legs are securely retained in retracted condition during road use.

When semi-trailer 10 is to be uncoupled from tractor 12, the forward legs at least are extended so that their foot plates 34 engage the ground to assume the weight of the forward end of the trailer. This may be done either manually or by means of motors 86. Assuming that the motors are to be used, shaft 104 will be shifted inwardly to the righthand position illustrated in FIGS. 3 and 5 so that clutch 101 is engaged. When motor 86 is actuated, it drives overunning clutch shaft 60 through drive shaft 88, clutch 101, gearing 124, 126, and shaft 134. Driving shaft 60 of clutch 58 releases clutch 58 and rotates driven shaft 56 in the manner described for operating jackscrew 44 to lower inner leg tube 24.

Once leg 20 has assumed the load of semi-trailer 10 and motor 86 is inactivated, jackscrew 44 is secured against retrograde operation by clutch 58 in the manner described. Thus, this clutch serves to secure leg 20 both in its upward, retracted position and its downward, load-bearing position.

Forward landing gears 16 may be used independently of the rear landing gears while the trailer is merely parked with the rearward end of the semi-trailer supported by its normal running gear. If the semi-trailer is to be levelled for field use, the rearward landing gear legs are extended downwardly in the manner described. Then the levelling device will operate motors 86 for driving clutch shafts 60 and jackscrews 44 through the proper distances and in the proper directions for levelling trailer floor 146. It is to be noted that while motors 86 are operably coupled to jackscrews 44 through clutches 101, it is impossible to interfere with the levelled condition of the semi-trailer by manual operation of shaft 104. This is because the unidirectional worm drive 90, 92 prevents rotation of drive shaft 88 and shaft 104 independently of motor 86. This feature provides insurance against inadvertent interference with operation of equipment contained in semi-trailer 110.

Legs 20 may be extended and shortened manually by means of crank 144 attached to shaft end 140. To accomplish this, shaft 104–140 is shifted axially to the left as FIGS. 4 and 5 are viewed to disengage clutch 101. If a low gear ratio is desired, the shaft is shifted to its intermediate position of FIG. 5 so that gear 124 remains engaged with gear 126. Then, upon turning of crank 144, clutch shaft 60 will be rotated for turning shaft 56 and operating jackscrew 44. If a high manual gear ratio is desired, shaft 104–140 is shifted further to the left to interengage gears 130 and 132. To reestablish the motor drive, shaft 104–140 is merely pushed to the right for re-engaging clutch 101. Detent ball 116 yieldably holds the shaft in its selected axial position.

To retract legs 20 for resumed highway operation, motors 86 or cranks 144 are operated in the proper direction for turning jackscrews 44 through clutch shafts 60 to withdraw leg tubes 24 upwardly into outer leg tubes 22. Without any further manipulation or locking procedures, the legs are retained in their upward positions by clutches 58 in the manner described.

Figure 10:
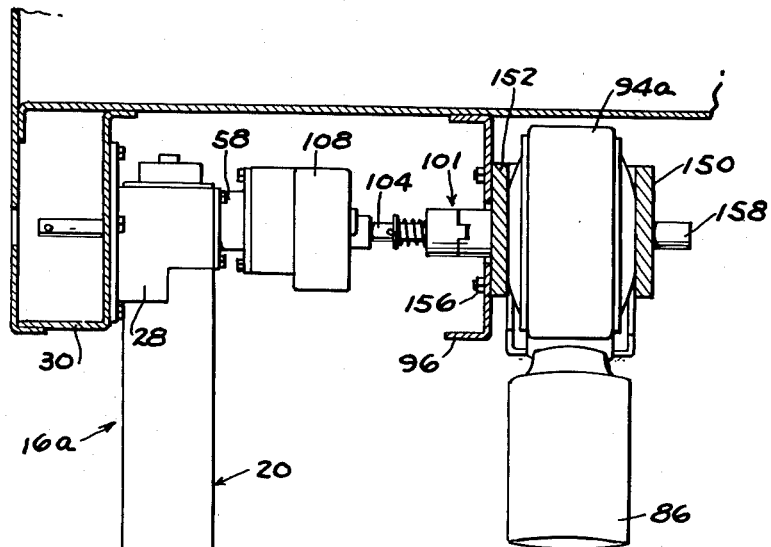
FIG. 10 is a view generally similar to FIG. 3 but shows a modified form of the invention.
Figure 11:
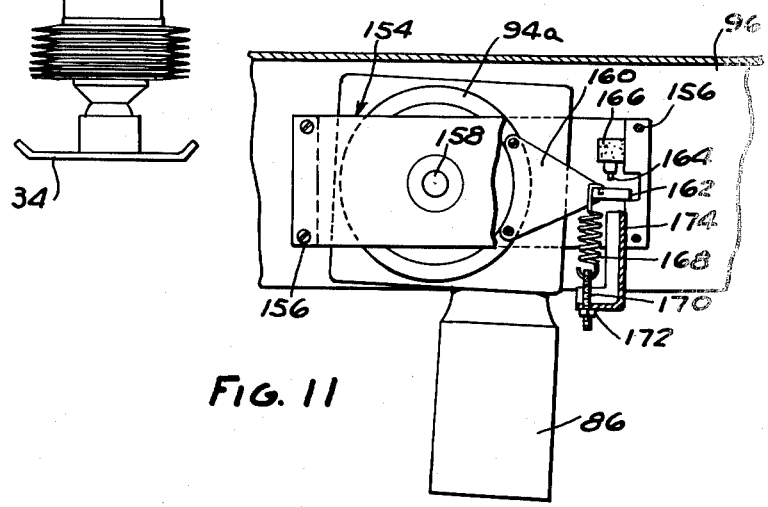
FIG. 11 is a fragmentary generally elevational view of the motor mount in the landing gear shown in FIG. 10.

The landing gear 16a shown in FIGS. 10 and 11 is similar to that described above except that housing 94a for worm wheel 90 is rockably mounted between two members 150 and 152 of a bracket 154 bolted to frame member 96 as at 156. For this purpose, shaft 88 is extended so that its outer end 158 projects through bracket member 152 to provide a rockable mount about the axis of shaft 88.

Fixed on housing 94a is a projecting member 160 terminating in a finger 162 positioned for engagement with the plunger 164 of a switch 166. Finger 162 is biased out of engagement with the plunger by such means as a spring 168 adjustably tensioned by an eye bolt 170 and nut 172 secured to a support 174 fixed with respect to motor bracket 154.

With this arrangement, when leg 20 is extended downwardly from the FIG. 10 position to the load-assuming position, finger 86 will remain in the FIG. 11 position until foot 34 engages the ground and leg 20 begins to assume some of the weight of the trailer. When this happens, further extension of leg 20 is resisted and the reaction to the output torque of shaft 88 shifts motor 86 and housing 94a bodily counterclockwise as FIG. 11 is viewed against the bias of spring 168, and finger 162 depresses plunger 164 to operate switch 166 and this in turn actuates suitable circuitry (not shown) for stopping motor 86.

By such extending of the legs and stopping of the motors, the operator is signaled that all of the legs of the vehicle are in condition to begin lifting the vehicle. This facilitates uniform elevation of the vehicle by all legs. If the operator is remote from the vehicle and cannot detect the initial starting and subsequent stopping of the motors, suitable circuitry may be associated with switch 166 to provide the operator with an additional signal indicating the condition of each leg, such as an electric light in an operating console. When a leg 20 of landing gear 16a is retracted, spring 168 rocks finger 162 out of engagement with plunger 164 so that the unit is conditioned for the operation described above upon subsequent extending of the leg.

I claim:

1. Powered landing gear structure for semi-trailer vehicles or the like comprising,
    a leg having sections which are mutually extensible and shortenable,
    means including a motor operatively connected with said leg sections for relatively extending and shortening them,
    mounting means adapted to mount said motor on a vehicle so that it can rock bodily under the influence of its reaction to driving torque,
    restraining means operable to exert force in restraint of reaction-induced rocking of said motor, said restraining means being yieldable to said reaction when the latter increases responsive to assumption of a part of the vehicle weight by said leg,
    and means operable responsive to said reaction-induced rocking to provide a signal indicating assumption of load by said leg.

2. The powered landing gear structure defined in claim 1 wherein the last-said means is operable to stop operation of said motor responsive to said reaction-induced rocking.

3. The powered landing gear structure defined in claim 1 wherein said restraining means comprises a spring yieldably tending to rock said motor in a direction opposite to the direction of said reaction-induced rocking.

4. The powered landing gear structure defined in claim 1 wherein said motor has an output shaft whose axis is substantially coincident with the axis about which said motor rocks.

5. The powered landing gear structure defined in claim 1 wherein said motor includes a housing which is adapted to be rockably mounted on a vehicle by said mounting means, said structure including switch means operable to actuate said signal-providing means, and switch-operating means mounted adjacent said housing, said housing including means positioned upon said reaction induced rocking thereof to engage said switch-operating means for actuating said signal-providing means.

6. The powered landing gear structure defined in claim 1 wherein said means operatively connected with said leg sections for relatively extending and shortening them, includes a two-directional overrunning clutch operable to restrain relative extending and shortening of said leg sections independently of said motor.

7. In combination, a semi-trailer or the like and powered landing gear structure of the type defined in claim 1 mounted thereon.

8. Powered landing gear structure for semi-trailer vehicles or the like comprising,
    a leg having sections which are mutually extensible and shortenable,
    means providing an operating device connected with said leg sections for relatively extending and shortening them,
    a motor,
    clutch means operably interposed between said motor and operating device, said clutch means being operable to restrain operation of said device independently of said motor,
    said motor having a housing,
    mounting means adapted to mount said motor housing on a vehicle so that said motor housing can rock bodily under the influence of the reaction to the driving torque of said motor,
    restraining means operable to exert force in restraint of reaction induced rocking of said motor housing, said restraining means being yieldable to said reaction when the latter increases responsive to assumption of a part of the vehicle weight by said leg,
    a control for said motor,
    and means operable responsive to said reaction-induced rocking of said motor housing to operate said control.

9. The powered landing gear structure defined in claim 8 wherein said motor has an output shaft whose axis is substantially coincident with the axis about which said motor housing rocks.

References Cited by the Examiner

UNITED STATES PATENTS

| 2,817,493 | 12/57 | Belcher | 254—86 |
| 3,033,522 | 5/62 | McKay | 254—86 |

WILLIAM FELDMAN, *Primary Examiner.*